Apr. 10, 1923.

F. INGERSOLL 1,451,545

FRYING PAN COVER HOLDER

Filed July 20, 1922

Inventor
Fred Ingersoll

By Philip A. Ferrell
Attorney

Patented Apr. 10, 1923.

1,451,545

UNITED STATES PATENT OFFICE.

FRED INGERSOLL, OF OMAHA, NEBRASKA.

FRYING-PAN-COVER HOLDER.

Application filed July 20, 1922. Serial No. 576,192.

*To all whom it may concern:*

Be it known that FRED INGERSOLL, citizen of the United States, residing at Omaha, in the county of Douglas and State of Nebraska, has invented certain new and useful Improvements in Frying-Pan-Cover Holders, of which the following is a specification, reference being had therein to the accompanying drawings.

The invention relates to frying pan cover holders and has for its object to provide a device of this character comprising oppositely disposed members having elongated jaws adapted to engage opposite sides of the frying pan and arms extending towards each other, said arms being pivotally connected at spaced points to a lever in such a manner that when the lever is forced downwardly the members will be securely clamped on the frying pan with their arms held downwardly. The arms are provided with downwardly and inwardly extending spring arms adapted to engage a cover and hold the same in close and frictional engagement with the inner inclined wall of the frying pan in such a manner as to prevent smoke and fumes from leaving the frying pan.

A further object is to form the device from wire, thereby allowing the same to be cheaply constructed.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1:
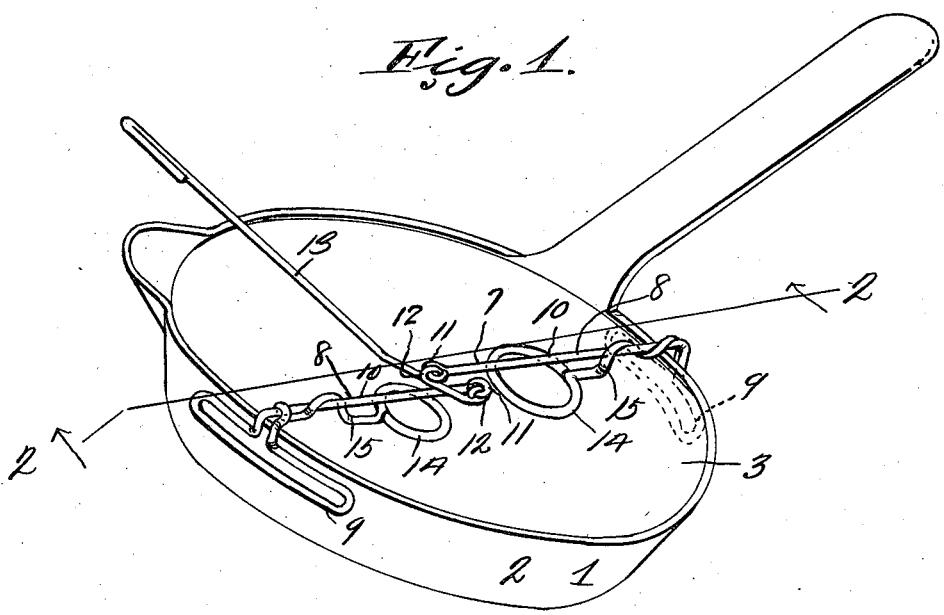
Figure 1 is a perspective view of a conventional form of frying pan showing the cover holder applied thereto.
Figure 2:
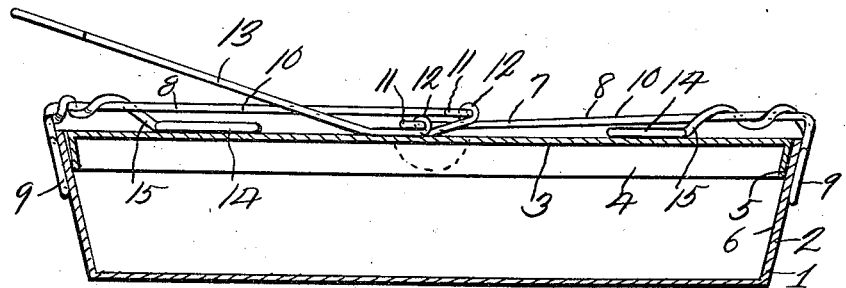
Figure 2 is a vertical transverse sectional view through the frying pan and cover taken on line 2—2 of Figure 1.

Referring to the drawing, the numeral 1 designates a conventional form of frying pan, which pan has its flange 2 tapering upwardly and outwardly.

Disposed within the upper end of the frying pan is a cover 3, which cover is provided with a downwardly extending annular flange 4, which tapers inwardly and frictionally engages at 5 the inner periphery 6 of the flange 2. It has been found that during a frying operation that smoke and fumes fill the room and the house and by placing simply a cover on the frying pan, the above objection is not obviated. To make a close and airtight joint at 5, the clamping device 7 is provided. The clamping device 7 comprises angular shaped members 8, which members are formed from single pieces of wire bent to form transversely disposed inwardly inclined looped members 9, which engage the opposite sides of the flange 2 and inwardly extending arms 10, which extend towards each other. The arms 10 terminate in eyes 11, which are pivotally mounted in spaced eyes 12 carried by the inner end of the handle member 13 in such a manner that when the handle member 13 is forced downwardly the eyes 11 and 12 at the end of the handle member will be raised slightly above the eyes 11 and 12 which are spaced from the inner end of the handle member thereby holding the handle member 13 in engagement with the cover 3 and the jaws 9 in close and binding engagement with the outer periphery of the flange 2 of the pan.

It is obvious that it is necessary to force the cover 3 downwardly for forming the airtight connection at 5. To accomplish this result, the wires after being bent to form the loops 9 are twisted around the arms 10 and terminate in loops 14 disposed beneath the arms 10, and in position to engage the upper sides of the cover, there being sufficient spring action in the members 15 to allow a flexing and to insure a downward spring action on the cover.

From the above it will be seen that a frying pan cover holder is provided, which is simple in construction, may be easily and cheaply made, and one which may be formed from heavy wire. It will also be seen that the device may be easily and quickly applied to a frying pan and will positively hold the cover 3 until the clamping device is removed by an upward movement of the free end of the handle 13.

The invention having been set forth what is claimed as new and useful is:—

1. The combination with a frying pan having a cover thereon, said cover frictionally engaging the inner periphery of the frying pan, of a cover holder, said holder comprising angularly shaped members, jaws carried by said angularly shaped members and engaging opposite sides of the frying pan, said members also having inwardly extending arms, a handle member, the inner ends of the inwardly extending arms being pivotally connected to the handle member at points so spaced that when the handle member is forced downwardly it will be held in engagement with the cover and the jaws in close and binding engagement with the sides of the pan, and members extending downwardly from the arms and engaging the upper side of the cover.

2. The combination with a frying pan, a cover frictionally engaging the inner periphery of the frying pan adjacent its upper side, of a cover holder, said holder comprising angularly shaped members having one of their arms engaging opposite sides of the pan, the other arms of the angularly shaped members extending towards each other and disposed above the cover, a handle member, the inner ends of the arms being pivotally connected to the handle member at spaced points adjacent one of its ends, said angularly shaped members being formed from single pieces of wire and downwardly and inwardly extending spring arms disposed below the inwardly extending arms and engaging the upper side of the cover.

3. The combination with a frying pan, a cover frictionally engaging the inner periphery of the frying pan adjacent its upper side, of a cover holder, said cover holder comprising angularly shaped members, said angularly shaped members being formed from single pieces of spring wire bent to form inwardly extending arms and transversely extending angularly disposed pan engaging jaws, the wire being twisted around the inwardly extending arm, the wire beyond the twist terminating in downwardly and inwardly extending arms, said downwardly and inwardly extending arms terminating in cover engaging loops, a handle member, the inner ends of said inwardly extending arms being pivotally connected to the handle member at spaced points.

In testimony whereof I hereunto affix my signature.

FRED INGERSOLL.